Oct. 6, 1925.
H. E. S. CHAYES
1,556,421
TOOL FOR DISTENDING OR DILATING DENTAL ANCHORING DEVICES
Filed May 5, 1922
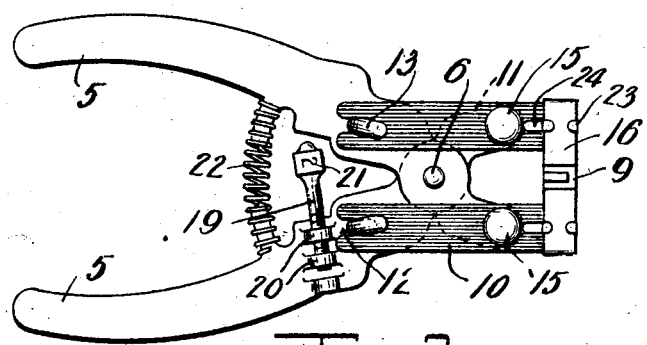
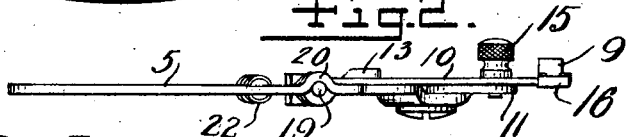
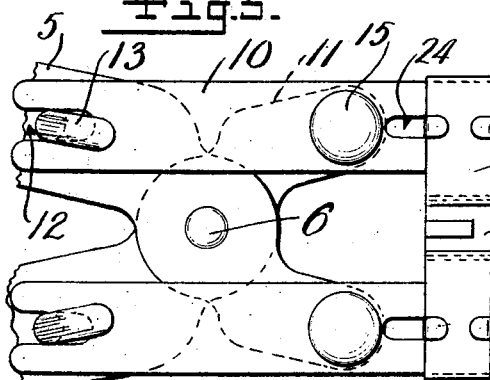
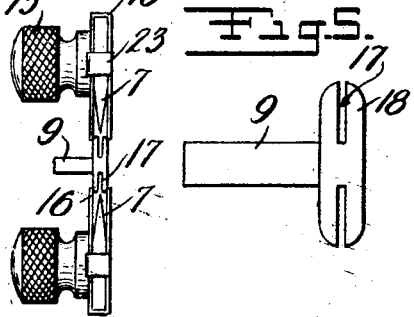
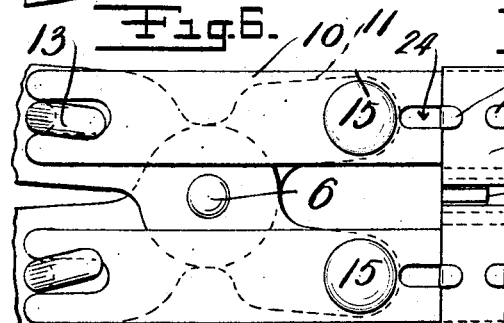
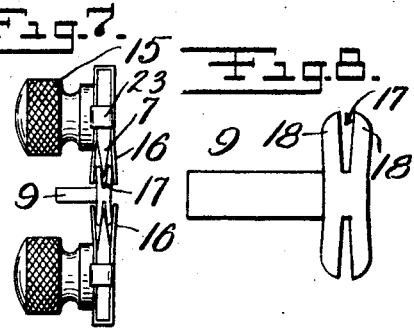
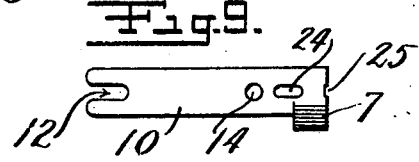

Patented Oct. 6, 1925.

1,556,421

UNITED STATES PATENT OFFICE.

HERMAN E. S. CHAYES, OF NEW YORK, N. Y., ASSIGNOR TO CHAYES SYSTEM LABORATORIES INC., OF NEW YORK, N. Y., A CORPORATION OF DELAWARE.

TOOL FOR DISTENDING OR DILATING DENTAL ANCHORING DEVICES.

Application filed May 5, 1922. Serial No. 558,656.

*To all whom it may concern:*

Be it known that I, HERMAN E. S. CHAYES, a citizen of the United States, residing at New York, in the county of New York and State of New York, have invented certain new and useful Improvements in Tools for Distending or Dilating Dental Anchoring Devices, of which the following is a specification.

This invention relates to a tool for distending or dilating dental anchoring devices of the expansible type.

In my pending application for patent Serial No. 486,102 filed July 20, 1921, I have described and claimed a dental anchoring device having a T-shaped formation in which the head portion is provided with inwardly directed slits along its opposite lateral margins. The wing members formed by the slits are adapted to be spread apart to provide the necessary distention to snugly fit the socket or seat in which they are received. The spreading apart of the wing members for the purpose indicated may be accomplished by the insertion of a pointed implement in each slit individually, but this method of operation is open to the objection that uniform spreading of the wing members is exceedingly difficult to accomplish by individual manipulation.

It is an object of this invention to provide a tool for expanding anchoring devices of the type described which will be free from the objections referred to and which will accomplish the expanding operation by simultaneously bringing equal pressures to bear in the oppositely disposed slits.

The invention includes the provision of a tool having a pair of wedge-shaped spreading members mounted for movement toward each other, and into the oppositely and outwardly facing slits of an anchoring device placed therebetween. Means are preferably provided for causing the spreading members to have right-line and parallel movement, the spreading members being also provided with guiding and holding devices for maintaining the anchoring device in proper position and insuring uniformity of spreading action in the opposite slits of the device. Preferably means are also provided for limiting the spreading action to a predetermined fixed extent variable at the will of the operator.

In the drawings, in which a preferred embodiment of the invention is illustrated—

Figure 1 is a view in side elevation of a tool embodying the invention.

Figure 2 is a plan view of the device shown in Figure 1.

Figure 3 is an enlarged detail of a portion of the device showing the tool in open position ready to begin an operation.

Figure 4 is an end view of the parts shown in Figure 3.

Figure 5 is a view in side elevation and on an enlarged scale of a dental anchoring device before being operated on by the tool.

Figure 6 is a view similar to Figure 3 showing the device at the completion of an operation.

Figure 7 is an end view of the parts shown in Figure 6.

Figure 8 is a view similar to Figure 5 showing an anchoring device after a spreading operation has been performed.

Figure 9 is a view in side elevation of a spreading member forming part of the device.

Referring to the drawings, a tool for expanding or dilating expansible dental anchoring devices is shown in Figures 1 and 2 of the drawing. The expanding tool includes a pair of handle members 5 having a pivoted or hinged relation at 6 and carrying at their forward portions a pair of wedge-shaped spreading members 7. The spreading members have an L-shaped formation as is clearly shown in Figure 9 of the drawing. The operating portion 7 as has already been indicated has the general conformation of a wedge and the two spreading member 7 with which the tool is equipped are mounted to move toward and from each other into and out of engagement with an anchoring device 9 which may be placed in position therebetween.

The stem portions 10 of the spreading members are arranged to engage the handle members 5 and the forwardly projecting ends 11 of the tool at equally separated points from the center of the pivot or hinge 6. In order to accomplish this the elongated stem portions 10 of the spreading members are provided at the end remote from the operating end with a notch or slot 12 which is arranged to engage a lug member 13 provided for the purpose on the forward end of each of the handle members 5. The stem portion 10 of the spreading members is also provided with an opening 14 through which a machine screw 15 having a knurled head can pass to anchor the spreading members in pivotal relation to the forward extremities 11 of the tool.

It will be seen that with the arrangement described the movement of the handle members 5 toward or from each other produces a parallel and right-line movement of the spreading members 7 toward or from each other.

In order to hold the individual anchoring devices 9 securely in place in the tool preparatory to performing a spreading operation thereon and also to preserve a proper relation between the spreading members and the anchoring device in order to produce an effective and accurate operation thereon, a resilient U-shaped guard member 16 is mounted on the operating portion of the spreading members 7 in such manner that the free ends of the guard member occupy a flanking relation to the apex of the wedge-shaped members 7. This arrangement of parts is clearly shown in Figures 4 and 7 of the drawing. In Figure 4 of the drawing the guard members 16 are shown in holding relation to the opposite slitted portions of the anchoring device 9 and it will be seen that the slits 17 in the anchoring device are so disposed that inward movement of the wedge members 7 would cause them to enter the slits and produce the desired spreading action on the anchoring device. In Figure 7 similar parts are illustrated, the relation of parts to each other being changed to accord with the operation of the tool and the bringing about of the spreading or expanding operation. It will be seen that the guard members 16 have operated to hold the anchoring device firmly in position and to preserve the proper relation of parts to cause the wedging members to produce a uniform spreading of the wing members 18 on opposite sides of the anchoring device.

In order to provide a predetermined variable limit to the extent of operation of the spreading device, an adjustable stop member 19 is provided which has a threaded mounting in suitable seats 20 carried on one of the handle members. Preferably the adjustable stop member 19 is provided with numerals or other indicia as at 21 to indicate an angular position of the adjustable member which will provide the desired limit to inward movement of the handle members 5.

The individual spreading members 7 can be readily removed and replaced when desired. This can be effected by removing the knurled screw 15 from each spreading member whereupon the spreading member can be lifted from its place. The guard members 16 can also be readily removed from the operating portions of the spreading members. This can be achieved by bending outwardly the clip ends 23 which preferably form part of one of the side walls of the guard member and which engage in an opening 24 and a notch 25 in the spreading member when in operative position.

In operation an anchoring device such as is shown in Figures 5 and 8 of the drawing and which is of such relatively small size as to make operation thereon with an ordinary punch or other tool extremely difficult is placed in position between the free ends of the guard members 16 as is shown in Figure 4 of the drawing. The handle members 5 are then pressed inwardly toward each other against the resistance of the spring 22 which results in the forcing of the oppositely disposed wedge members 7 into the oppositely disposed slits 17 in the interposed anchoring device. It will be seen that the parallel motion and right-line movement of the wedge members 7 which is effected by the specific mounting of the wedge members on the operating members of the tool brings about a uniform movement of the whole length of each apex of the wedge members into the corresponding slit of the anchoring device. This results in a uniform and equalized operation of the device throughout the length of each slit so that the wing members on each side of the anchoring device are uniformly spread throughout their length and the most efficient and effective disposition of the parts is thereby obtained. It will also be seen that in the operation of the device the adjustable stop member 19 is turned to a desired position to limit the spreading action to bring about a uniform action in the succession of operations.

What is claimed is:

1. In a tool for expanding anchoring devices, a pair of handles pivoted together in the form of a pair of pliers, and two cooperating spreader members, each connected to both handles for parallel motion towards and from each other as the handles are operated, opposed socket members on the spreaders, and a wedge member within and spaced from the walls of one of the socket members, substantially as and for the purpose set forth.

2. In a device for expanding anchoring devices having oppositely disposed and outwardly opening slits, a pair of spaced apart and inwardly directed wedge members, guard members carried by the wedge members for holding the work, and means for moving the wedge members toward each other with their apices in a common plane and into the oppositely disposed slits of the work.

3. In a device for expanding anchoring devices having oppositely disposed and outwardly opening slits, a pair of spaced apart inwardly directed wedge members, spring members mounted in flanking relation to the wedge members for holding the work in position to be operated on, and means for moving the wedge members toward each other with their apices in a common plane and into the oppositely disposed slits of the work.

4. In a device for expanding anchoring devices having oppositely disposed and outwardly opening slits, a pair of spaced apart inwardly directed wedge members, spring members carried by the wedge members in flanking relation thereto and extending beyond the apices thereof for holding the work in position to be operated on, and means for moving the wedge members toward each other with their apices in a common plane.

5. In a device for expanding anchoring devices having oppositely disposed and outwardly opening slits, a pair of spaced apart inwardly directed wedge members, spring members carried by the wedge members in flanking relation thereto and extending beyond the apieces thereof for holding the work in position to be operated on, means for moving the wedge members toward each other with right-line movement and with their apices in a common plane, and adjustable means for determining the extent of inward movement of the wedge members.

6. In a device for expanding anchoring devices, a pair of handle members pivoted together in the form of a pair of pliers, a pair of spaced apart elongated members pivoted to the handle members at equal distances from both sides of the pivotal point, and wedge members carried at the outer extremities of said elongated members, said wedge members extending parallel to the longitudinal axis of the device and with their apices in a common plane and directed inwardly toward each other.

In testimony whereof I affix my signature.

HERMAN E. S. CHAYES.